(No Model.) 2 Sheets—Sheet 1.
A. V. ABBOT & F. C. F. KNAAK.
AUTOMATIC VALVE AND COUPLING.
No. 398,111. Patented Feb. 19, 1889.
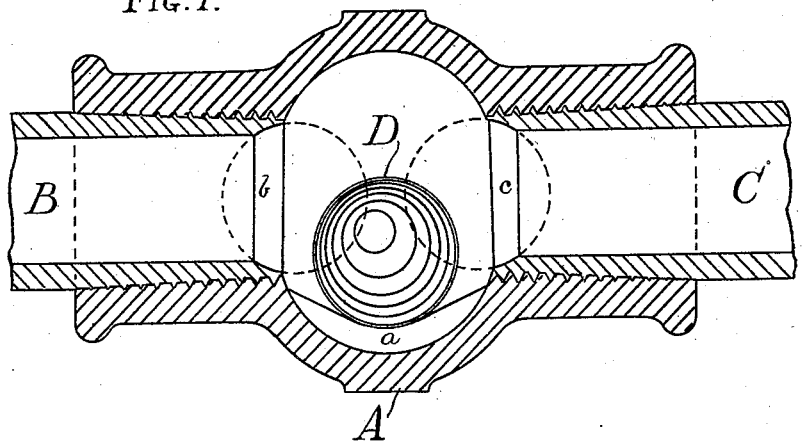
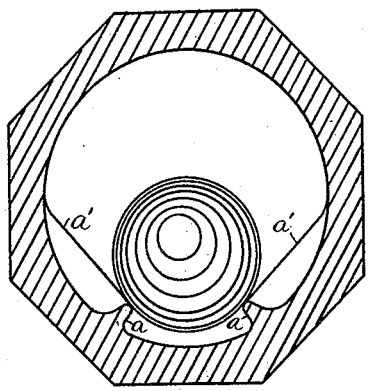
WITNESSES:
INVENTOR.
Arthur V. Abbot
Frank C. F. Knaak,
BY
W. W. Canfield
ATTORNEY.

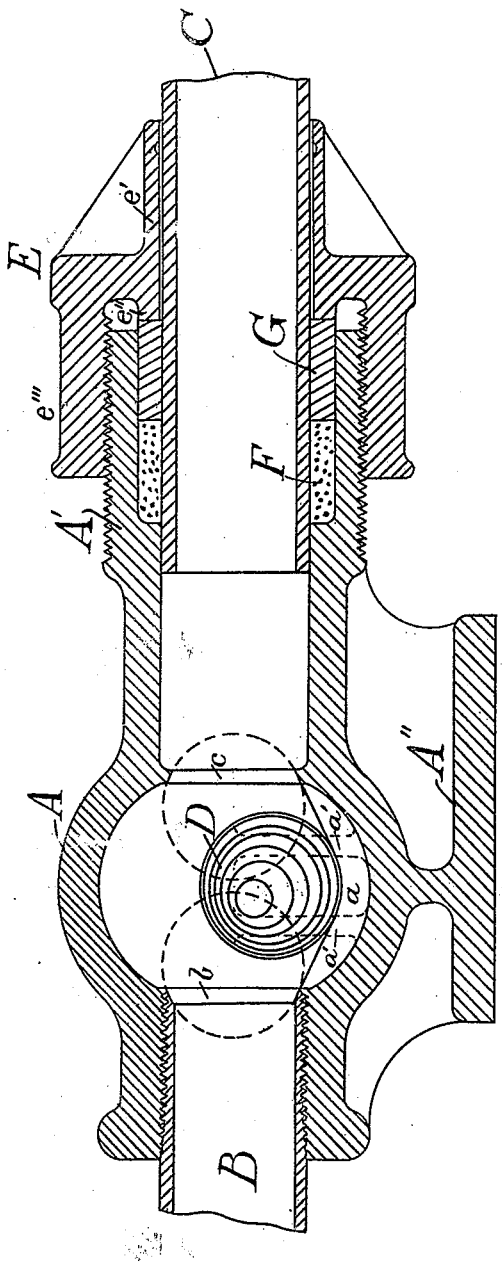

UNITED STATES PATENT OFFICE.

ARTHUR V. ABBOT, OF CLOSTER, NEW JERSEY, AND FRANK C. F. KNAAK, OF NEW YORK, N. Y., ASSIGNORS, BY MESNE ASSIGNMENTS, TO THE NATIONAL HEATING COMPANY, OF NEW YORK, N. Y.

AUTOMATIC VALVE AND COUPLING.

SPECIFICATION forming part of Letters Patent No. 398,111, dated February 19, 1889.

Application filed July 30, 1887. Serial No. 245,677. (No model.)

*To all whom it may concern:*

Be it known that we, ARTHUR V. ABBOT, of Closter, in the county of Bergen, and State of New Jersey, and FRANK C. F. KNAAK, of New York, in the county of New York and State of New York, citizens of the United States, have invented certain new and useful Improvements in Automatic Valves and Pipe-Couplings, of which the following is a specification.

Our invention is an improvement in automatic cut-offs or valves and couplings; and it consists in the construction and combination of parts hereinafter described and claimed.

The object of our invention is to produce an automatic safety-valve or cut-off and a coupling designed to be used in connection with high-pressure, hot-water, and steam-heating apparatus and systems, and especially in connection with what is now known as the "Prall system of heating," in which water heated much above the steam-generating point is forced through pipes or mains under a high degree of pressure. It is evident, however, that our improvement may be used in almost any system of fluid-supply or heating system, steam-heating, and other similar forms of apparatus.

In the accompanying drawings, forming parts of this specification, and in which similar letters designate like parts throughout the several views, Figure 1 is a central longitudinal vertical section, and Fig. 2 a central transverse section, of one form of our improved valve-chamber, the valve being shown in full lines. Fig. 3 is a longitudinal central section of the valve-chamber and expansible joint.

B and C are sections of pipes of a hot-water or similar system.

A is a coupling formed with an enlarged central chamber substantially circular in cross-section.

$a$ $a$ are concaved flanges or ribs formed within said chamber, the lowest parts of the concaved upper edge of said ribs being in a plane passing transversely through the center of said chamber. These ribs, as clearly shown in Figs. 1 and 3, terminate at the lower edge of the opening on either side of the coupler into which the pipes B and C are screwed.

$a'$ $a'$ are small ribs or guides formed in the walls of the chamber and extend from the flanges or ribs $a$ upward till they vanish in the inner side walls of the chamber. The object of this construction will hereinafter appear. Within the said chamber is placed a ball-valve, B, preferably made of or covered with material that will not rust, and which is just large enough to admit of its being inserted within said chamber through one of the said openings before the pipes B and C are screwed in. Valve-seats $b$ and $c$ are formed upon the pipes B and C respectively.

In Fig. 3 we have shown our automatic valve in combination with an expansible coupling, the only difference in the valve construction being in the valve-seat $c$, which in this case is formed upon the coupler. This construction is necessitated by reason of the provision for the longitudinal movement of the pipe C, connected with that end of the coupler. The coupler itself, however, is different in form, being provided with an enlarged extension, A', screw-threaded, as shown, and so formed as to provide an offset or enlargement of the end opening in which are placed a metallic band or ring, G, and asbestus or other equivalent packing, F. The said ring and packing exactly fit within and fill up the space or chamber formed by the enlargement of the extension A'. The band or ring G and packing F are held in place by a head, E, which is provided with a body portion, $e'$, having a central bore the same in size as that in the end of the coupler before the enlargement A'. The head E is also provided with a small flange or projecting rim, $e''$, adapted to press upon the ring G, hereinbefore described, and a cylindrical socket or rim, $e'''$, provided with screw-threads upon its inner surface adapted to engage the screw-threads upon the enlargement A' of the coupler. The pipe C is inserted within the head E and the coupler, the inner surface of each and the outer surface of the pipe being so formed as to produce a close joint, but one that will admit of the longitudinal movement of the pipe C. The head E may be screwed down upon the extension A' and the pressure upon the ring G and packing F be increased or diminished, as desired. The coupler shown in Fig. 3 is also provided with a base, A″. The object of this construction is to provide for the longitudinal expansion of the pipes or mains under the high degree of heat to which the same are subject in the Prall or other systems of fluid or steam heating, and the object of forming this expansion-joint in connection with the automatic valve and coupler, as shown, is to avoid the necessity of forming separate couplings for the valve and the expansion-joint, and thereby economize in the construction of the apparatus and render the same more compact and durable. It is also well known that in the systems of heating herein referred to the pipes or mains are laid underground and the coupling and expansion-joint must be examined by the use of man-holes. In our construction the valve-coupling and expansion-joint are brought together, and can thus both be examined at once and by the use of the same man-hole.

The operation of the automatic valve is as follows: The system being in its normal condition and operating under a given or predetermined pressure, the water or other heating agent will pass through the coupling without disturbing the valve D, which rests in the position shown in Figs. 1 and 3, upon the lowest part of the concaved ribs a. Should, however, the pipe C, by accident or otherwise, be broken or ruptured, the valve D will be raised from its normal position by the increased velocity of the fluid-current in the pipe B and seated upon the valve-seat c, whereby all flow of hot water or other heating agent into the pipe C will be immediately cut off. The action would be exactly the same if the pipe B were to be broken or ruptured from any cause, the pressure from the pipe C in this instance forcing the valve to its seat b, whereby the flow in that direction would be cut off, as in the first instance. The ribs or flanges a serve as ways upon which the valve D rests and by which it is guided, while the guides or ribs a′ serve to guide the valve back to its position upon the ways or ribs a after it has by any cause been thrown from said position. It is evident, however, that the ribs or ways a may be formed at such an angle of inclination as to render the use of the guide-ribs a′ unnecessary. It will be also seen that the ribs or ways a admit of the free passage of the water or other agent under and around the valve. The weight of the valve must always be graded according to the pressure of the circulating medium and the velocity at which the same circulates in any system or plant in which it is used. The weight of the valve, together with the inclination of the ribs a a, are also mutually interchangeable and may be adjusted one with reference to the other so that the valve shall operate when employed in any system of conveying fluids of any density and at any velocity, the object being that the valve must never be closed by the normal pressure or velocity of the circulating medium of the system, which is always predetermined, or by any slight increase thereof, but only in the case of the breakage or rupture of one of the pipes and the consequent sudden and highly-increased velocity and pressure from the opposite direction, as hereinbefore described.

The use of the inclined ribs to support the valve tends to prevent the formation of rust on the valve and walls of the valve-chamber, and by admitting of a free circulation of the circulating medium under and around the valve to prevent the accumulation of sedimentary deposits of various kinds within the valve-chamber.

Having thus fully described our invention, its construction and operation, we claim and desire to secure by Letters Patent of the United States—

1. The combination, with a coupler having a central globular chamber provided with inclined or concave ribs or ways extending longitudinally of the lower part of said chamber, of a ball-valve, substantially as described.

2. The combination, with a coupler having a central globular chamber provided with inclined or concave ribs or ways extending longitudinally of the lower part of said chamber and guides a′ extending laterally and upwardly from the outer side of each rib or way, of a ball-valve, substantially as described.

Signed at the city of New York, county of New York, and State of New York, this 27th day of July, A. D. 1887.

ARTHUR V. ABBOT.
FRANK C. F. KNAAK.

Witnesses:
DANIEL E. DELAVAN,
W. W. CANFIELD.